United States Patent Office 3,434,928
Patented Mar. 25, 1969

3,434,928
PROCESS FOR PREPARING PEPTONE FOR BACTERIAL CULTURE
Ryoichi Naito, Ibaragi-shi, Yoshigoro Oguro, Osaka, and Yorihiko Murata, Amagasaki-shi, Japan, assignors to The Green Cross Corporation, Osaka, Japan, a corporation of Japan
No Drawing. Filed May 1, 1967, Ser. No. 634,843
Claims priority, application Japan, Nov. 16, 1966, 41/75,351
Int. Cl. C12b 3/12, 3/14
U.S. Cl. 195—29    2 Claims

ABSTRACT OF THE DISCLOSURE

Peptone suitable for culturing bacteria, which is prepared as follows: The human placenta frozen immediately after the delivery is finely minced, treated with physiological saline solution and a wet residue mainly consisting of placental tissue cells and soluble in physiological saline solution is separated, this residue is treated with a proteolytic enzyme to digest cell components. After adequate progress of the digestion, the digest solution is heated under pressure and allowed to stand for cooling to obtain peptone from the supernatant and is dried.

BRIEF SUMMARY OF THE INVENTION

The present invention relates to a process for preparing peptone used for the bacterial culture by digestion and heat-treatment of protein contained in the human placenta.

DETAILED DESCRIPTION

Peptones used to culture bacteria, especially pathogenic germs, or to collect cultured products of microorganisms have been known for a long time, and those prepared by digesting natural proteins such as milk casein and animal meats, etc., which are used as starting materials have been presented. The main component of these ready made-products is not peptone defined by chemically narrow sense but the products contain nitrogen compounds of protein-hydrolyzates obtained in various steps of the protein hydrolysis, extending from proteoses of large molecular weights to amino acids of comparatively small molecular weights. For peptones used for the bacterial culture, there are various different requirements according to their uses and purposes. For example, it is known that for culture and multiplication of a majority of disease germs, those prepared by proceeding the proteolysis up to a step of amino acid are suitable, especially, trytophan and cystine-rich content is important for the biological differentiation of bacterias, while proteose-rich peptone prepared by limiting proteolysis to peptic hydrolysis is rather preferred for the production of exotoxines.

Since contamination of components of culture medium materials is unavoidable to some extent when each kind of bacterial vaccine is produced from cultured products of bacteria as well as when toxoids derived from bacterial toxines are produced, such components are given parenterally to the human body by injection of these vaccines and toxoids, though they may be usually a trace. When starting materials of peptones, i.e., main components of culture media are milk casein, beef, horse muscle, whale muscle, fish meats or soy-bean protein, these proteins or a hydrolyzate, i.e., albumose naturally give sensitization to human bodies as foreign proteins and can possibly be causes for allergy or anaphylaxis. In fact, after injections of vaccines or toxoids are given for the purpose of prevention or treatment of diseases, attacks of serious secondary reactions have been observed, though rarely. Especially, since serums for treatments of diphtheria and tetanus are mainly prepared from horse serum, serious dangers are caused by injection of anti-diphtheria serum and anti-tetanus serum by the above-mentioned reason when components resulting from proteolysis of constituent protein of horse body are used as materials for the production of vaccines. Therefore, the Department of Public Welfare has forbidden by the administrative notice to use horse-muscle for culture media used to produce pertussis vaccine, diphtheria toxoid, and tetanus toxoid.

The object of the present invention is to provide a process for producing peptones used for the bacterial culture consisting of proteins not to be any foreign proteins to the human body.

The present inventors attempted to search for proteins not to be foreign proteins to the human body on the basis of the above-mentioned problem, and turned a special attention to utilize the human placenta delivered at the time of parturition and incinirated as a dirt. The human placenta weighs 600 g. on the average about 85% of which is water, and contains about 10% of protein.

The present invention provides a process to produce a powdery peptone used for the bacterial culture by using human placenta as a starting material, digesting this with proteolytic enzymes such as pepsin hydrochloride and papain etc., and heating at 121° C. under pressure after adequate progress of digestion, finally followed by complete evaporation of water.

Example 1

Delivered human placentas are frozen in a freezer as soon as possible to prevent putrefaction for preservation. Such frozen placenta are collected from hospitals and maternity hospitals, 500 of which are taken out and roughly crushed by an ice-crusher and finely minced by a meat cutter. Finely minced placentas are vigorously stirred in 500 l. of physiological saline solution (0.85% to 0.9% saline solution) and sediments are collected by centrifugation. Extracellular components such as blood and amniotic fluid etc. are removed by washing and wet sediment mainly consisting of tissue cells and insoluble in physiological saline water (to be mentioned simply wet sediment below) can be obtained.

To 90 kg. of this wet sediment, 60 liters of water are added, followed by further addition of 180,000 gelatin units of a vegetable proteolytic enzyme papain, pH is adjusted to 6.5–7.5, the whole mixture is kept at 50°–60° C., allowed to stand for 10 to 12 hours with stirring and acidified to make it pH=3.0 by addition of dilute hydrochloride acid after sufficient digestion of protein. Remaining protein is coagulated and precipitated by heating and then filtered. The filtrate is further heated at 121° C. for 30 minutes in a high pressure steam autoclave and allowed to stand for cooling. The resulting precipitate is separated by filtration and the filtrate is dehydrated by a spray dryer or a drum-dryer, thus 6900 g. of a dried powdery peptone containing 4% or less moisture are obtained.

Analytical values observed with a peptone for the bacterial culture thus obtained are as shown below.

When this product peptone is dissolved in ordinary water to make 2% solution, pH of which is adjusted to a vicinity of 7.2 with weak alkali and staphylococcus, dysentery bacillus salmonella and chlorea-vibrio are cultured after heat-sterilization, these bacteria all showed sufficiently favorable growth and multiplication and did not show any inferiority compared with those prepared from milk casein material which had been used so far.

Example 2

60 liters of water are added to 90 kg. of wet sediment obtained by the same process as that shown in Example 1, its pH is adjusted to 3.0 with hydrochloric acid, 45,000

Frud units of pepsin are further added and mixed stirring at 30°–39° C. for 7–9 hours, remaining protein is precipitated by heat coagulation and filtered, the filtrate is subjected to further 30 minutes-heating in a high pressure steam autoclave at 121° C. and allowed to stand for cooling. Resulting precipitate is separated by filtration and the filtrate is dehydrated by a spray dryer or drum-dryer. Thus, 1930 g. of a dried powdery peptone with 4% or less moisture content are finally obtained.

The analytical values observed with peptone for the bacterial culture thus obtained are as follows:

20 g. of this product peptone are dissolved in 1,000 ml. of water simultaneously with 7.5 g. of glucose, 0.2 g. of cystine, 0.01 g. of potassium dihydrogen phosphate and 0.01 g. of anhydrous sodium monohydrogen phosphate according to the known prescription, adjusted to pH 7.2 with sodium hydroxide, subdivided into flasks, on which liquid paraffin is layed and sterilized in a high pressure steam autoclave at 121° C. for 20 minutes to prepare the anaerobic culture medium used in general. Clostridium tetani was inoculated in this culture medium and cultured at 37 for 7–9 days, the culture solution was filtered through a diatomaceous earth filter. Concentration of tetanus toxine contained in the filtrate was measured with the known method, and it was observed that toxine production was as high as showing 0.035 ml. or less L+amount observed with the standard tetanus antitoxinum, which did not show even the slightest inferiority when compared with a peptone for toxine prepared by using milk casein as a material which had been used so far.

Values observed by chemical analysises with peptones produced by Examples 1 and 2 are shown in the following table.

| Analysis | Peptone (percent) prepared in Example 1 | Peptone (percent) prepared in Example 2 |
| --- | --- | --- |
| (1) Total nitrogen | 13.01 | 11.30 |
| (2) Primary proteose nitrogen | 0.18 | 1.25 |
| (3) Secondary proteose nitrogen | 1.24 | 5.72 |
| (4) Peptone nitrogen | 10.71 | 3.46 |
| (5) Ammonia nitrogen | 0.88 | 0.87 |
| (6) Free amino nitrogen | 4.10 | 2.21 |
| (7) Mono-amino nitrogen | 8.85 | 7.30 |
| (8) Di-amino nitrogen | 3.11 | 2.75 |
| (9) Tryptophan | 0.89 | 0.53 |
| (10) Tryosine | 0.71 | 2.07 |
| (11) Cystine | 0.35 | 0.28 |
| (12) Ash | 11.98 | 25.0 |
| (13) Ether soluble extract | 0.95 | 0.43 |
| (14) Water | 3.5 | 4.0 |

In the above analytical table, the values were obtained by the following determinations respectively: (1) total nitrogen was obtained by Kjeldahl method, (2) primary proteose nitrogen was observed by Kjeldahl method with a fraction which precipitated by 50% saturation of zinc sulfate, (3) secondary proteose nitrogen was observed also by Kjeldahl method with a fraction which precipitated by 100% saturation of zinc sulfate, (5) ammonia nitrogen was obtained by a determination of ammonia distilled out by distilling the sample in alkali as it is without any decomposition, (6) free amino nitrogen was investigated by Van-Slyke method and (4) peptone nitrogen shows a value obtained by substracting the total value of (2), (3) and (5) from the value of (1).

When a small amount of peptones produced by Example 1 and Example 2 is repeatedly injected to a rabbit, then, thus immune serum is obtained from this rabbit 3 weeks after the final injection and reacted with serums of other animals and water soluble muscle extracts separately obtained from human being, horse, cow, sheep and goat by the precipitation reaction, precipitation lines sometimes slightly observed with human serum, but reactions with proteins due to other animals are always negative. But, in spite of the result of such in-vitro investigation, since the starting material is the human placenta, it is not foreign protein to the human being, accordingly, vaccines and toxides for the preventive inoculation produced by using peptones prepared from the human placenta as culture medium materials do not contain any foreign protein reaction source except a trace of pig-origin protein accompanied by pepsine used, therefore, any danger based on foreign proteins can be eliminated.

What is claimed is:

1. A process for preparing peptones for bacterial culture comprising finely mincing human placenta frozen immediately after the delivery, treating them with physiological saline solution, separating wet sediment mainly consisting of cellular components and insoluble in physiological saline water, adding a proteolytic enzyme to the above-mentioned wet sediment to digest the aforementioned cellular components of the human placenta, heating the digest solution obtained by adequate progress of digestion at 120° C. under pressure, allowing it to stand to cool and obtaining a peptone from the supernatant.

2. A process described in claim 1 in which the above-mentioned proteolytic enzyme is pepsin hydrochloride or papain.

References Cited

UNITED STATES PATENTS 3,170,839  2/1965  Or _____ 167—78

A. LOUIS MONACELL, *Primary Examiner.*

J. L. WINDE, *Assistant Examiner.*

U.S. Cl. X.R.

195—99